United States Patent [19]

Burrage et al.

[11] Patent Number: 4,590,549
[45] Date of Patent: May 20, 1986

[54] CONTROL SYSTEM PRIMARILY RESPONSIVE TO SIGNALS FROM DIGITAL COMPUTERS

[75] Inventors: Robert G. Burrage, Solihull; Stanley G. Glaze, Kingswinford; James Tipton, Solihull, all of England

[73] Assignee: Lucas Industries, England

[21] Appl. No.: 498,860

[22] Filed: May 27, 1983

[30] Foreign Application Priority Data

Jun. 3, 1982 [GB] United Kingdom ............... 8216234

[51] Int. Cl.$^4$ .................. G05B 15/08; G05B 9/02; G06F 7/02; H04L 1/00
[52] U.S. Cl. ................................. 364/131; 364/184; 364/200; 371/67; 371/68
[58] Field of Search ............... 364/131, 184, 186, 187, 364/200, 900, 133; 371/67, 68

[56] References Cited

U.S. PATENT DOCUMENTS

| | | | |
|---|---|---|---|
| 4,096,990 | 6/1978 | Strelow | 371/68 X |
| 4,130,241 | 12/1978 | Meredith et al. | 364/200 X |
| 4,151,590 | 4/1979 | Azegami | 364/131 |
| 4,153,198 | 5/1979 | Eki et al. | 371/68 X |
| 4,200,226 | 4/1980 | Piras | 364/187 X |
| 4,266,273 | 5/1981 | Dobler et al. | 364/187 X |
| 4,344,128 | 8/1982 | Frye | 364/153 X |
| 4,358,823 | 11/1982 | McDonald et al. | 371/68 X |
| 4,370,706 | 1/1983 | Doniger et al. | 364/184 |
| 4,504,905 | 3/1985 | Burrage | 364/131 X |

FOREIGN PATENT DOCUMENTS 2105492 8/1982 United Kingdom .

OTHER PUBLICATIONS

Pinto et al., "Adaptive Synchronization of Processing Clocks", *IBM Technical Disclosure Bulletin*, vol. 22, No. 5, Oct. 1979.
Swenson, "Alternate Path Control Systems", *IBM Technical Disclosure Bulletin*, vol. 16, No. 5, Oct. 1973.

*Primary Examiner*—Jerry Smith
*Assistant Examiner*—Jon D. Grossman
*Attorney, Agent, or Firm*—Andrus, Sceales, Starke & Sawall

[57] ABSTRACT

A system controlled by digital computers includes first and second dissimilar digital computers which are distinctly programmed to generate respective nominally identical control signals alternately. The computer alternately generates limiting values for the control signals, each limiting value being generated in a different computer from that in which the control signal was generated. An unacceptable difference between the control signals and their limiting values causes control of the system to be switched to a third computer, which may be an analog computer. The comparisons are also made between the control signals themselves and between the limiting values themselves, and unacceptable differences may cause control to revert to the third computer or alternatively to be transfered to an arrangement generally similar to that set forth above.

7 Claims, 6 Drawing Figures

CONTROL SYSTEM PRIMARILY RESPONSIVE TO SIGNALS FROM DIGITAL COMPUTERS

TECHNICAL FIELD

This invention relates to control systems in which control is primarily or wholly effected by signals from digital computers. Such systems are commonly referred to as "full authority" digital control systems.

BACKGROUND ART

In a full authority digital control system the control activity is commonly regulated by a digital data processor which is itself responsive to sensed and/or desired operating conditions. The number of these operating conditions may be large, and each of the individual conditions may fall within substantial ranges of values. The combinations and sequences of the operating values will then be very large indeed, so that it will not be possible to test the system over the whole of the combined operating conditions which it may encounter in use. The problem is increased by the relative ease with which a digital control system may be reprogrammed, so that extensive tests carried out with the system under control of a superseded program will no longer be valid.

UK Patent application 2105492A discloses a full authority digital control system in which control signals from a first digital computer are compared with limit signals which are generated by a second computer, which is responsive to at least some of the input signals supplied to the first digital computer. If the control signals from the first computer exceed limits set by the second computer, control of the system is switched to a third computer which is dissimilar to the first computer. In order to enhance the reliability of the second and third computers it has been proposed that the second computer shall be an analog computer and that the third computer shall be responsive to a limited number only of the input parameters of the first computer, and shall provide only a crude emergency control of the system.

Inability to predict the response of a full authority system under all operating conditions has led to reluctance on the part of authorities connected with airworthiness to approve such systems for use in aircraft, particularly since an inappropriate response of the system to a combination of conditions, cause malfunction of all apparatus controlled by the data processor. It will be apparent moreover that duplication of identically programmed computers will not overcome this problem, since each is likely to malfunction simultanteously and in the same way.

The present invention provides a control system having two digital computers each of which is capable of providing output control signals over a full range of input parameters, and in which the control signals from each computer are subject to rigorous checks. Specifically the invention provides that the output control signals from each digital computer is checked against a corresponding control signal provided by a separately-programmed dissimilar computer, and against a limit signal provided by a separately-programmed dissimilar computer. Additionally each limit signal is checked against a corresponding limit signal which is provided by a computer which is dissimilar and separately programmed from the computer providing the first-mentioned limit signal.

DISCLOSURE OF THE INVENTION

According to the invention, there is provided a system which is primarily controlled by a digital computer, said system comprising an apparatus responsive to input control signals and a computer arrangement comprising first and second dissimilar digital computers which are programmed with respective distinct first and second control programs which are responsive to operating conditions of the apparatus for providing first and second nominally identical output signals, said input control signals normally being derived from said first or said second output signal, a third computer responsive to selected ones of said operating conditions for providing third output signals, said second and first computers also being programmed with respective first and second distinct limiter programs which generate limiting values for said first and second output signals respectively and which provide first and second indicating signals if either of said first or second output signals exceeds its respective limiting value by a predetermined amount, and switching means responsive to said first or second indicating signals for deriving said input control signals from said third output signal.

In a preferred embodiment there is provided means for controlling operation of said first and second computers so that said first control program and said first limiter program operate concurrently and said second control program and said second limiter program operate concurrently, and so that said first and second programs are run alternately.

In a particular embodiment there is provided two of said computer arrangements, and the first and second computers in said first arrangement having control and, limiter programmes which are distinct from the programmes of the corresponding computers in said second arrangements.

BRIEF DESCRIPTION OF THE DRAWINGS

An embodiment of the drawing will be described by way of example only and with reference to the accompanying drawings, in which.

BEST MODE OF CARRYING OUT THE INVENTION

The figures accompanying the following description should be read in conjunction with each other, corresponding parts having identical reference numbers.

Figure 1:
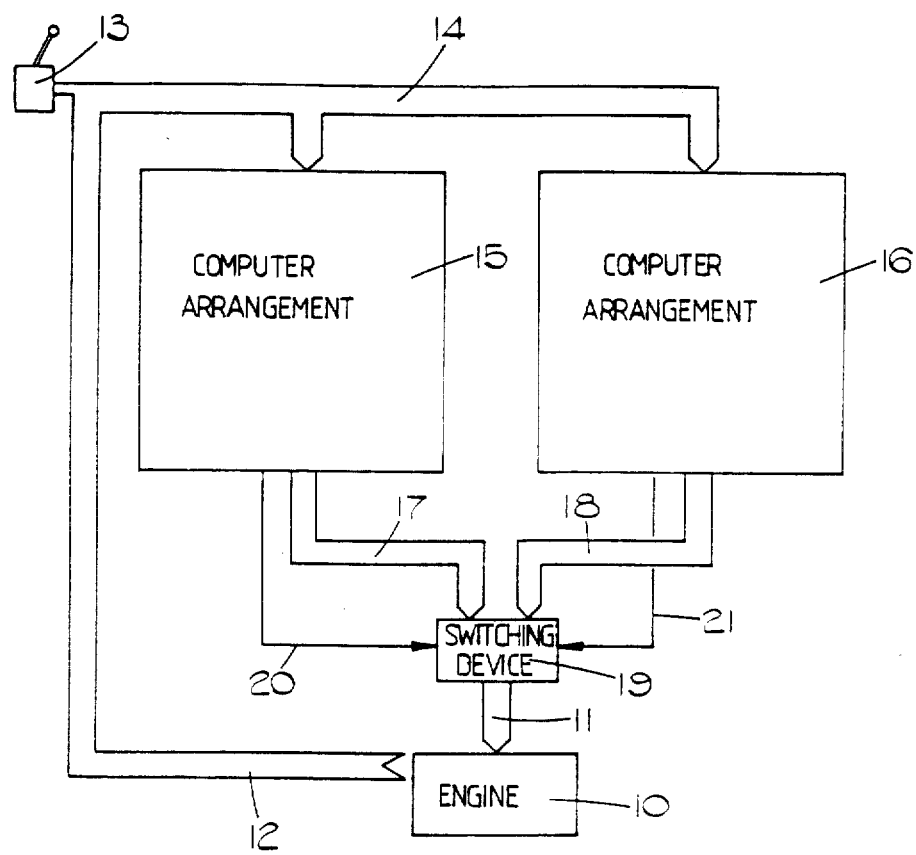
FIG. 1 is a block diagram of a control system according to the invention.

The described embodiment relates to a control system for a gas turbine engine. As shown in FIG. 1 the gas turbine engine 10 is responsive to analog input control signals on a plurality of lines 11, and operating conditions of the engine 10, as for example compressor pressures, engine speeds and temperatures, and compressor temperatures are supplied from the engine 10 on a plurality of lines 12. The signals on lines 12 are combined with signals from an engine speed selector device 13 and are supplied on lines 14 to two digital computer arrangements 15, 16, one of which is shown in more detail in FIG. 2. Analog output signals from the arrangements 15, 16 are supplied on respective groups of lines 17, 18 to a switching device 19 of a known type. The device 19 is responsive to change-over signals on lines 20, 21 from the respective arrangements 15, 16, these signals being generated in a manner to be described hereafter.

Figure 2:
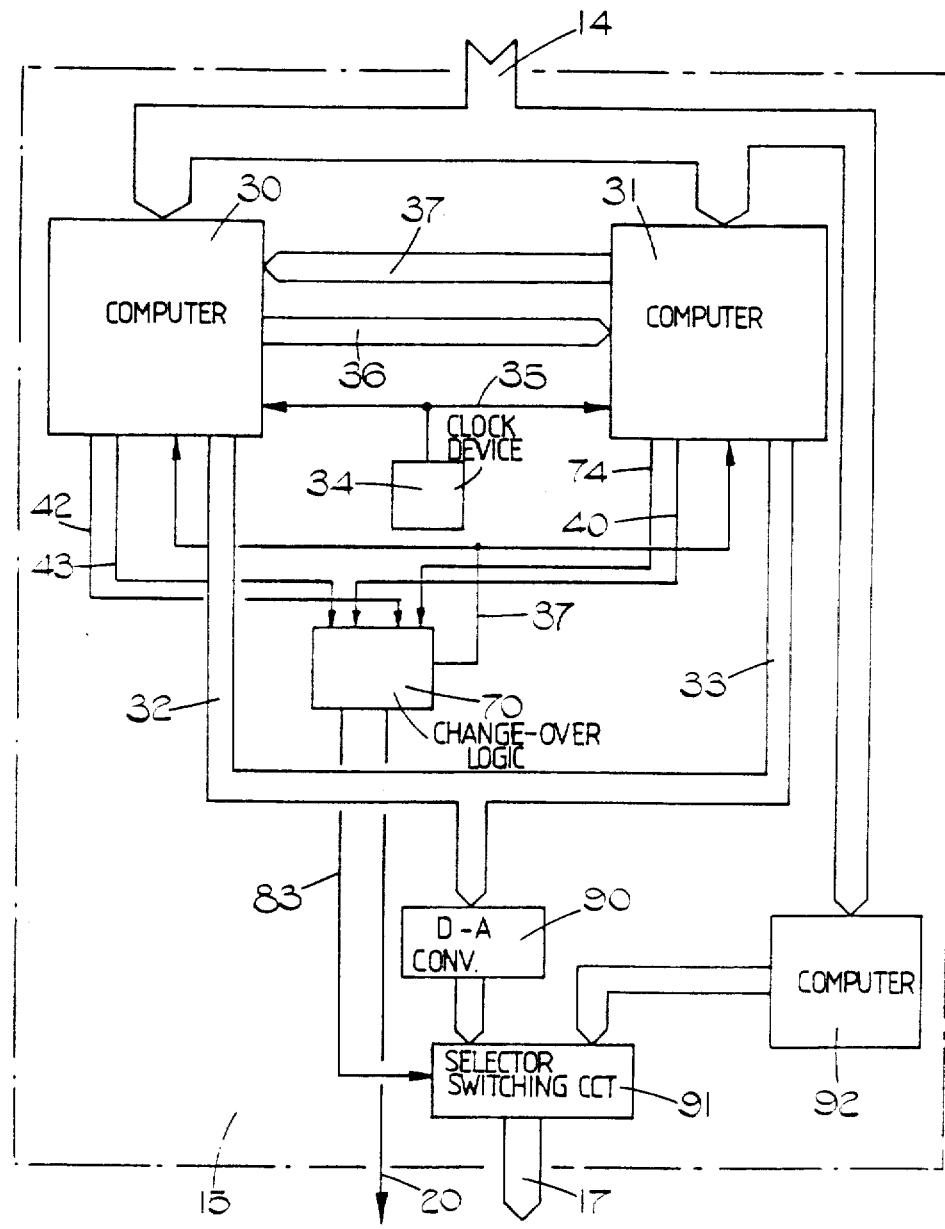
FIG. 2 is a block diagram of a computer arrangement forming part of FIG. 1.

A block diagram of the arrangement 15 is shown in FIG. 2 and comprises two computers 30, 31, each of which is responsive to the signals on lines 14. The computers 30, 31 are of different hardware designs and are independently programmed with respective distinct control programs which are responsive to the signals on lines 14 to provide nominally identical output control signals C1, C2 on lines 32, 33 respectively. The computers 30, 31 are also respectively programmed with distinct limiter programs which are also responsive to the signals on lines 14. Computer 31 generates limit signals L1 which define acceptable values for the signals on lines 32, for corresponding values of the signals on lines 14. Similarly the computer 30 generates limit signals L2. which define acceptable values for the signals on lines 33.

The computers 30, 31 are under control of pulses 35 from a clock device 34, and the arrangement is such that the programs for the control signal C1 and for the limit signal L1 run concurrently, and are alternated with the programs for the signals C2, L2 which also run concurrently. Each program runs for 10 milliseconds on each occasion. In the present examples this is effected by rendering the programs for signals C1, L1 responsive to a logic '1' from the device 34, and the programs for signals C2, L2 responsive to a logic '0' from the device 34. Instantaneous values of the signals C1 or L2 are supplied to the computer 31 on lines 36, and instantaneous values of the signals C2 or L1 are supplied to the computer 30 on lines 37.

During a first time interval T1, when the signal from the device 34 is at logic '1' the values C1, L1 are generated. The signal C1 is transferred on lines 36 to computer 31 and compared therein with the values of L1. If the value of C1 is greater than, or equal to, the value of L1, this may be symptomatic of a major system design fault, as for example an error in the system analysis, and a flag signal Fs1 is generated on a line 40. During time T1 a previously stored value of signal L2 is also transferred on lines 36 to computer 31 and compared therein with the value of L1. If the difference between these signals is greater than or equal to a relatively small value d1, this is likely to be symptomatic of a minor hardware or program fault, and a signal Fm1 is generated. Also during the time T1 a value C2 previously stored in the computer 31 is transferred on lines 37 to computer 30 and compared therein with the value of signal C1. If a difference between these latter values is greater than, or equal to, a relatively small value d2, this is likely to indicate a minor programming or hardware fault, and a signal Fm2 is generated.

During time T2, when the signal from the device 34 is at logic '0', values of L2 and C2 and the values of L2 and L1 are compared in computer 30, and the values of C2 and C1 are compared in the computer 31, in the manner described above.

Signals Fs2, Fm3 and Fm4 are generated in response to fault conditions revealed by the respective comparisons during time T2.

The comparisons indicated above are set out in Table 1 below, indicating the computers in which these comparisons take place.

| COMPUTER | TIME | |
|---|---|---|
| | T1 | T2 |
| 30 | C1 v C2 $\geq$ d2 (Fm2) | L2 $\leq$ C2 (Fs2) |
| | | L2 v L1 $\geq$ d1 (Fm3) |
| 31 | L1 $\leq$ C1 (Fs1) | C2 v C1 $\geq$ d2 (Fm4) |
| | L1 v L2 $\geq$ d1 (Fm1) | |

Figure 6:
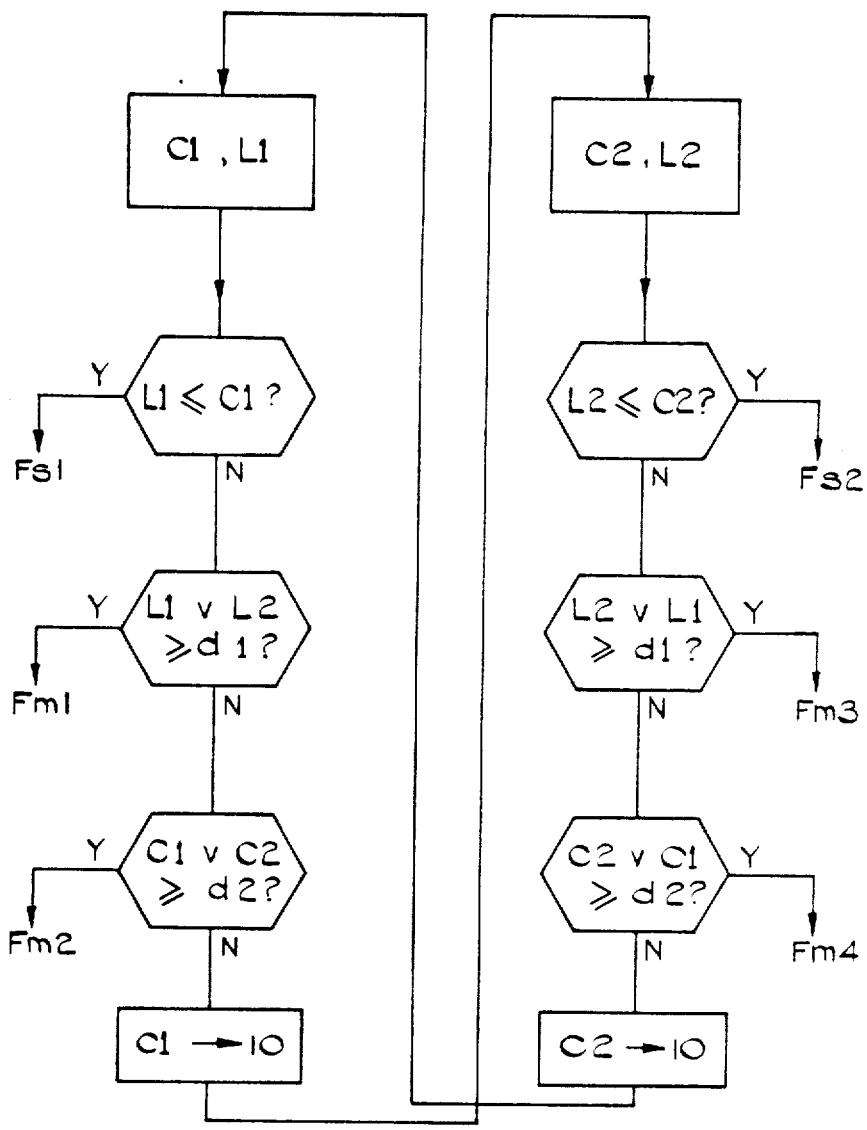
FIG. 6 is a chart indicating the checks carried out in each computer arrangement.

The comparisons are also shown as in FIG. 6 one possible sequence of events. It must be emphasised that the sequence shown is unimportant, provided that after generation of the control and limiting signals the necessary comparisons are carried out before the control signals C1 or C2 are passed to the engine 10.

Figure 3:
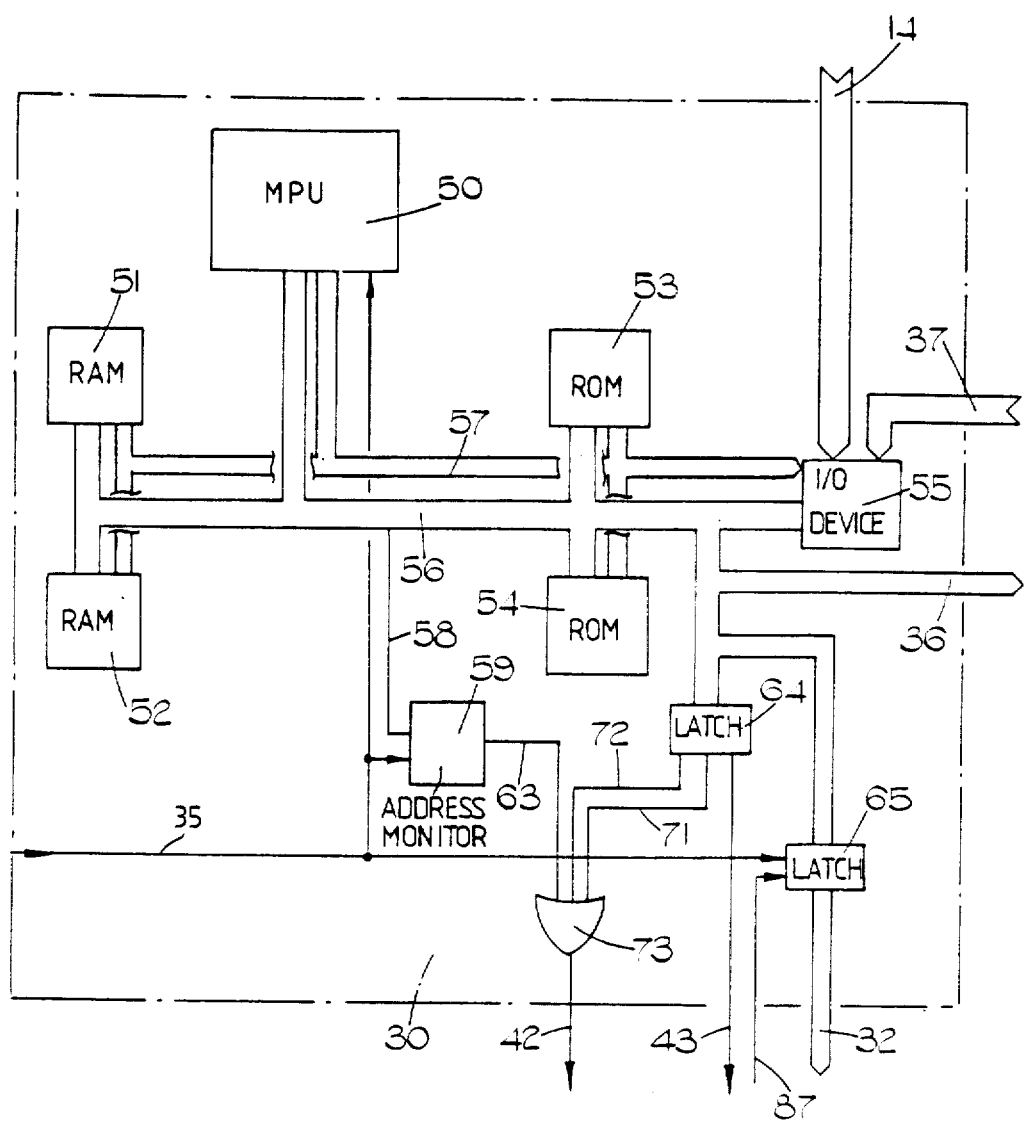
FIG. 3 is a diagram of a computer forming part of the arrangement of FIG. 2.

FIG. 3 indicates the layout of the computer 30. Computer 31 is generally similar but, as indicated above, has different hardware and is independently programmed. Computer 30 comprises a microprocessor (MPU) 50, two RAMs 51, 52, two ROMs 53, 54 and an input/output device 55, these elements being interconnected by an address and data bus 56 and by a control bus 57. The RAM 51 and ROM 53 are addressed only when the program for control signal C1 is running, and the RAM 52 and ROM 54 are addressed only when the program for the limit signal L2 is running. It is arranged that the most significant bit of address data for RAM 51 and ROM 53 is always logic '1' and that the corresponding bit of address data for RAM 52 and ROM 54 is always logic '0'. These address bits should therefore correspond to the signals on line 35 from the clock device 34, provided that the programs are running properly. The most significant bit currently on the address bus is supplied on a line 58 to an address monitor circuit 59, where it is compared with the signal on line 35.

Figure 4:
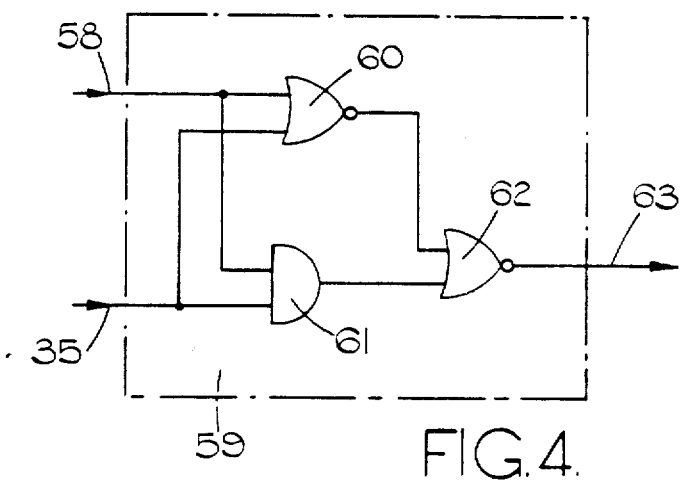
FIG. 4 is a logic arrangement forming part of FIG. 3.

The monitor circuit 59 is shown in detail in FIG. 4 and comprises a NOR date 60 and an AND gate 61, both of which are responsive to the signals on lines 35, 58. A NOR gate 62 is responsive to the output states of the gates 60, 61. The arrangement is such that there is a logic '0' on an output line 63 from the gate 62 only when the logic states of the signals on lines 35, 58 are the same.

As shown in FIG. 3 the input/output device 55 is supplied with input data on lines 14 and with values of C2, L1 on lines 37 from the computer 31. Data lines from the bus 56 also communicate with a latching circuit 64 on which the flag signals FS2, Fm2 and Fm3 are held, if present. The aforesaid data lines also with a latching circuit 65 on which the control signal C1 is held to await validation as a result of the comparisons described above. Latching circuit also holds the signal C1 for passing on lines 36 to computer 31, for comparison with the value of C2 during time T2.

Figure 5:
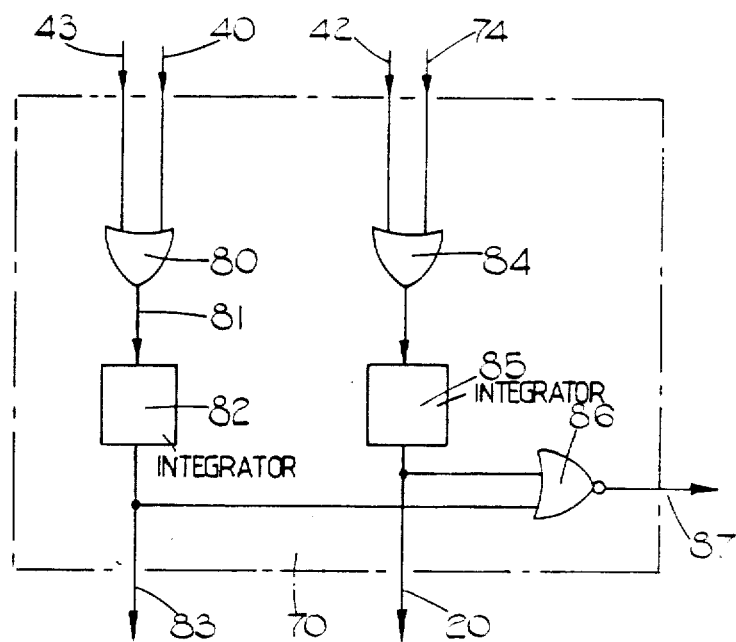
FIG. 5 is a logic circuit forming part of the arrangement of FIG. 2.

If the flag signal Fs2, indicative of a major system fault, is present, this signal is supplied from the latching circuit 64 on the line 43 to a change-over logic circuit 70 (FIG. 2), shown in more detail in FIG. 5 and to be described hereafter. If either of the flag signals Fm2 or Fm3 is present, indicative of a minor programming or hardware fault, these signals are supplied by the latching circuit 64 on respective lines 71, 72 to an OR gate 73 (FIG. 3). The signal on line 63 from the monitor circuit 58 is also supplied to the OR gate 73. The arrangement is such that if either of signals Fm2 or Fm3 is present, or if the address on the bus 56 is not appropriate to the time T1 or T2 signalled by the clock device 34, a fault signal is provided on line 42 to the logic circuit 70. "Minor fault" signals, corresponding to the signal on line 42, are supplied to the logic circuit 70 and a line 74 (FIG. 2) from the computer 31 in response to the presence of flag signals Fm1 or Fm4, or to an indication that an address within computer 31 is not appropriate to the time T1 or T2.

As shown in FIG. 5 the logic circuit 70 includes an OR gate 80 to which fault signals on the lines 40, 43 are applied. The gate 80 thus provides a fault signal on a line 81 in the presence of fault signals on either of lines 40, 43. An integrating circuit 82 of a known type is responsive to the signal on line 81 to provide an output signal on a line, 83, only if the signal on line 81 persists for more than a predetermined time.

The circuit 70 also includes an OR gate 84 which is responsive to signals on the lines 42, 74. An integrating circuit 85 is responsive to an output signal from the gate 84 and provides a signal on the line 20 (see also FIGS. 1 and 2) if a fault indication signal from the gate 84 persists for more than a predetermined time. A NOR gate 86 is responsive to signals on lines 20, 83 to provide a signal on a line 87 only in the absence of a fault indication on line 20 or 83. The signal on line 87 is applied to the latching circuit 65 (FIG. 3) to allow the C1 value stored therein to be supplied on the lines 32, provided that the clock signal on line 35 also indicates time T1. The signal on line 87 is also applied to a corresponding latching circuit in the computer 31 to enable the C2 value to be supplied on lines 33 during time T2.

As shown in FIG. 2 the lines 32 and the lines 33 are both applied to a digital to analog converter 90, from which analog signals are supplied on the lines 17, by way of a selector switching circuit 91. A further computer 92, which may be an analog computer, is responsive to selected ones of the input signals on lines 14, to provide control signals to the switching circuit 91, these signals being sufficient to effect safe control of the engine 10, even though this control may not provide optimum operating conditions. Operation of the switching circuit 91 in response to a fault indication on line 83 causes control signals on the lines 17 to be derived from the computer 92.

The computer arrangement 16 is preferably identical in all respects to the arrangement 15. As a result major design faults such as systems analysis faults are likely to be common to both of the arrangements 15, 16. For this reason a fault indication on the line 83, indicative of such a major fault, causes control of the engine 10 to revert to the computer 92. A fault indication on line 20, indicative of one of a number of minor hardware or software faults causes the switching device 19 (FIG. 1) to place the engine 10 under control of the computer arrangement 16.

It will be understood that the system could equally be operated with the engine 10 initially under control of the arrangement 16, and that minor faults occurring in that arrangement would result in control being shifted to arrangement 15.

In an alternative, simplified system there is provided only the computer arrangement 15. In such a system the switching device 19 is omitted and both major and minor fault indications are arranged to cause control to revert to the computer 92 (FIG. 2).

We claim:

1. A control system which is primarily controlled by a digital computer, said system comprising:
   (a) an apparatus responsive to input control signals,
   (b) and a computer arrangement comprising:
      (1) first and second digital computers which have different hardware designs and which are programmed with respective first and second control programs which in turn are repsonsive to operating conditions of said apparatus for providing first and second substantially identical output signals;
      (2) a third computer responsive to selected ones of said operating conditions for providing third output signals;
      (3) switching means for causing said input control signals to be supplied either by said first and second output signals or by said third output signals;
      (4) said second and first computers also being programmed with respective first and second limiter programs which:
         (A) generate limiting values for said first and second output signals respectively,
         (B) and provide first and second output indicating signals if either of said first and second output signals exceeds its respective limiting value by more than a predetermined amount;
      (5) said switching means being responsive to said first or said second indicating signals for causing said third output signals to supply said input control signals;
      (6) and a timer device for generating time signals for controlling operation of the first and second computers so that said first control program and said first limiter program operate concurrently, and said second control program and said second limiter program operate concurrently, and said first programs are alternated with said second programs.

2. A system as claimed in claim 1 in which said first and second computers are also programmed to compare said limiting values and to generate third indicating signals when a difference between said limiting values reaches a predetermined amount.

3. A system as claimed in claim 2 in which said first and second computers are also programmed to compare said first and second output signals and to generate fourth indicating signals when a difference between said output signals reaches a predetermined amount.

4. A system as claimed in claim 3 in which said switching means is responsive to said third and fourth indicating signals to cause said input control signals to be derived from said third computer.

5. A system as claimed in claim 3 which includes two of said computer arrangements, and there is provided a switching device responsive to any of said third and fourth indicating signals from one of said computer arrangements to cause said input control signals to be derived from the other of said computer arrangements.

6. A system as claimed in claim 1 in which said first and second computers each includes first and second separate stores for data for said control program and said limiter program respectively, each said first and second computer being programmed so that one bit of the address data for said stores is indicative of whether said address data relates to a control program or to a limiter program, and there is provided a monitor circuit for comparing said one bit with said timing signals and for providing a fifth indicating signal if said one bit and said timing signals do not correspond.

7. A system as claimed in claim 6 in which said switching device is also responsive to said fifth indicating signal.

* * * * *